United States Patent [19]
Atwood et al.

[11] Patent Number: 5,664,486
[45] Date of Patent: Sep. 9, 1997

[54] BAGEL FORMING APPARATUS

[75] Inventors: Harold Atwood; Thomas Atwood, both of Dolton, Ill.

[73] Assignee: AM Manufacturing Company, Inc., Dolton, Ill.

[21] Appl. No.: 740,243

[22] Filed: Oct. 25, 1996

[51] Int. Cl.⁶ .............................. A21C 3/00; A21C 5/00; A21C 11/00; A23P 1/00
[52] U.S. Cl. .................. 99/450.2; 99/353; 99/450.1; 425/321; 425/335; 425/364 B
[58] Field of Search .................. 99/450.1–450.8, 99/494, 516, 353–355; 425/321, 334, 335, 371, 364 B, 403, 364 R, 393; 426/503, 512, 514, 518, 499

[56] References Cited

U.S. PATENT DOCUMENTS

| | | | |
|---|---|---|---|
| 4,343,603 | 8/1982 | Pavlow et al. | 99/353 X |
| 4,741,263 | 5/1988 | Ueno et al. | 99/450.2 |
| 4,905,583 | 3/1990 | Hyashi | 99/450.1 X |
| 4,996,915 | 3/1991 | Morikawa et al. | 99/450.2 |
| 5,018,439 | 5/1991 | Bordin | 99/450.2 |
| 5,281,120 | 1/1994 | Morikawa et al. | 99/450.2 X |
| 5,378,133 | 1/1995 | Atwood et al. | 425/461 X |
| 5,395,229 | 3/1995 | Atwood | 425/364 B |
| 5,417,989 | 5/1995 | Atwood et al. | 426/496 X |
| 5,440,974 | 8/1995 | Ueno et al. | 99/450.2 |
| 5,460,081 | 10/1995 | Ueno et al. | 99/450.2 |
| 5,503,861 | 4/1996 | Atwood | 426/503 |
| 5,540,578 | 7/1996 | Atwood | 425/364 B |

OTHER PUBLICATIONS

Excalibur Automatic Bagel Divider & Former brochure, 2 pages, date unknown.

DBE Brochure, "Our Bagel & Bakery Customers Lean on Us A Lot", 6 pages, date unknown.

Excellent Bakery Equipment Co., Automatic Bagel Dividers & Formers Brochure, 4 pages, date unknown.

Empire Automatic Bagle Machine Brochure, 2 pages, date unknown.

BMD Model "R" Bagel Former with 62 Divider Brochure, 2 pages, date unknown.

DBE Automatic Bagel Divider – Former – System Brochure, 1 page, unknown.

Table Top Bagel Divider/Former, Model BM-DF-3000 Brochure, 2 pages, date unknown.

*Primary Examiner*—Timothy F. Simone
*Attorney, Agent, or Firm*—Hill, Steadman & Simpson

[57] ABSTRACT

A dough forming machine having a stationary frame with a flat top surface, a continuous belt wrapped around said flat plate having a drive drum at one end and a idler drum at a respective other end, the drive drum being driven for rotation by a motor, and a forming tube above said plate and receiving a section of the belt through the tube to curl the belt into a cylindrical shape. An arcuate plastic pressure plate upstream of said forming tube is elevated a distance from a surface of the continuous belt for receiving dough pieces between the arcuate pressure plate and the continuous belt for forming the dough pieces into a circular shape in the forming tube around a mandrel extending within the tube. At an output end of the forming tube is arranged a rotating table for receiving formed dough pieces, the rotating table driven by a drive belt which receives power from the motor. The rotating table is advantageously foldable downwardly during non-use. Plastic inserts can be provided for being held within the forming tube to selectively decrease the diameter of the forming tube for forming different sized circular dough pieces.

16 Claims, 4 Drawing Sheets

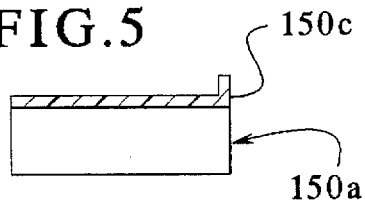
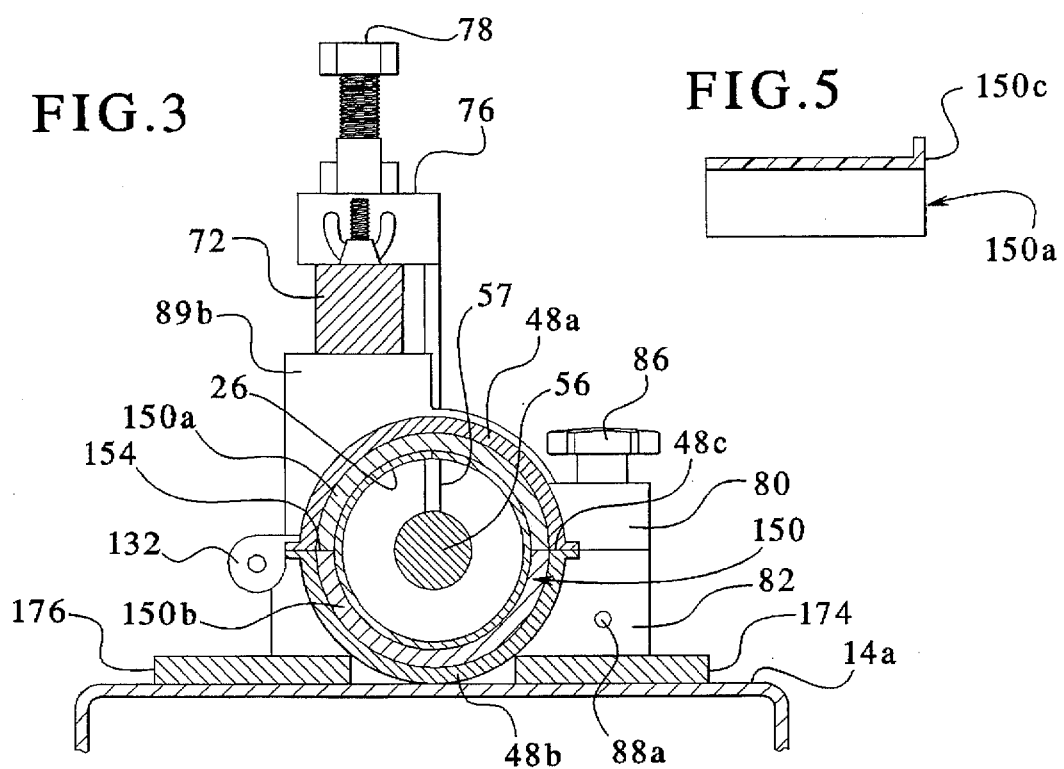
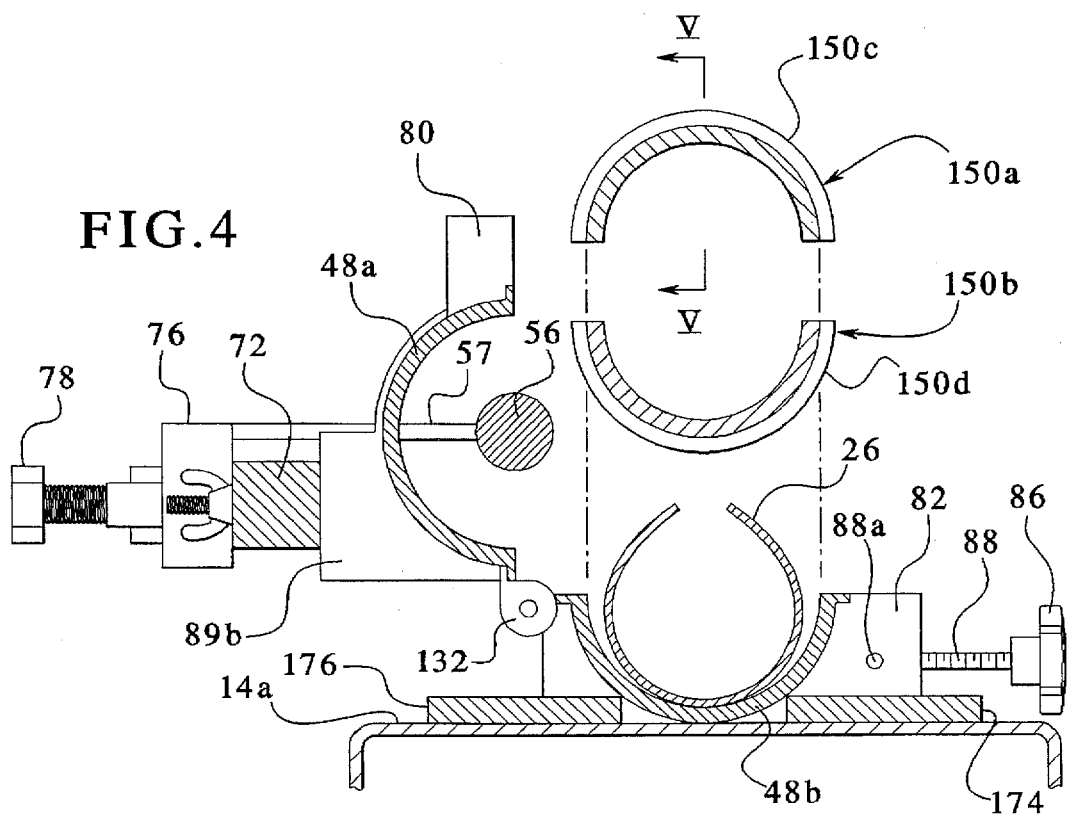

BAGEL FORMING APPARATUS

BACKGROUND OF THE INVENTION

The present invention relates to a dough forming machine, and in particular to a bagel dividing and forming machine which forms circular rolls from dough pieces, such as bagels. The invention provides an improvement to such a machine.

Machines for dividing and forming bagels are known. In such a machine, a motor driven circulating looped belt is provided with a horizontal top surface. The belt is wrapped around an idler drum and a drive drum. At a first end of the machine, a pressure plate having a downward arcuate surface toward the belt is provided, slightly elevated from a top surface of the belt. When an incremental amount of dough is placed onto the belt, the belt carries the dough beneath the pressure plate which causes the incremental amount of dough to roll and elongate into a solid cylinder shape. At approximately the mid-span of the top surface of the belt is arranged a forming tube having an inside diameter sized to provide a forward bagel with a desired outside diameter size. A mandrel with an outside diameter sized to provide an appropriate size center hole of the bagel is mounted axially through the forming tube.

The lateral edges of the belt are wrapped upward into a circular shape corresponding to the inside diameter of the forming tube, the belt passing through the forming tube while in the circular shape and once is exiting the forming tube, the belt flattens back down into a flat horizontal profile. Before returning to the first end of the assembly, the belt extends above a rotary table which receives the formed product which drops off the belt.

The forming tube typically comprises two half circular sections with a seam located on a top side of the tube. Such a device is shown for example in U.S. Pat. No. 5,395,229.

Prior known machines have parts which complicate the manufacture of the machine. Typically, the pressure plate is manufactured of metal bent into the desired shape. The machine provides a platform beneath the top surface of the belt which is recessed in the region of the forming tube to allow the tube to be hingedly opened for cleaning and insertion of a new belt, or replacement of the tube. This recess adds to the manufacturing cost and complexity of the machine. Additionally, prior machines required two motors, one for circulating the belt via the drive roll and a second motor for turning the rotary table.

SUMMARY OF THE INVENTION

It is an object of the present invention to provide a machine for forming dough into annular shapes, such as for bagels, which has a reduced complexity and is economically built, and which operates efficiently. It is an object of the invention to provide a machine which is readily adaptable to form annular shapes of different sizes. It is an object of the invention to provide a machine for forming dough in an annular shape which reduces the number of drive motors required.

An object of the invention is achieved in that a forming tube which receives a top horizontal segment of a continuous belt and which wraps the belt into a tubular shape has a horizontal seam which is hinged on one side of the tube and lockable on a respective other side of the tube. The forming tube is constructed according to a standard size and receives removable inserts to adjust the inside diameter thereof. Thus, expensive forged tubes for varying a tube inside diameter can be avoided. Additionally since the tube is strengthened by the insert, a less substantial tube can be provided compared with conventional forged forming tubes. An object is achieved in that with the tube so configured, a platform arranged beneath the top surface of the belt in the tube area can remain planar without need for a recess.

An object of the present invention is achieved in that the prior art metal pressure plate is replaced with a rugged cast or extruded plastic pressure plate. An object of the invention is achieved in that the plastic pressure plate can be provided on a bottom surface thereof with a cloth liner which assists in the smooth forming of log shaped dough pieces between the cloth belt and the cloth underside of the pressure plate.

An object of the invention is achieved in that a drive belt take-off is provided from a motor which drives a drive drum of the continuous belt to rotate a rotary table or carousel which receives the formed dough pieces. An object of the invention is achieved in that the rotary table or carousel is pivotally connected to the platform structure to pivot downwardly about a horizontal axis for shipping and storage of the unit or when the use of the rotary table is not needed. Thus, the overall length of the machine can be reduced in a convenient manner.

BRIEF DESCRIPTION OF THE DRAWINGS

FIG. 3 is a sectional view taken generally along line III—III of FIG. 1;

FIG. 4 is a sectional exploded view according to FIG. 3 in an open condition;

FIG. 5 is a sectional view taken generally along line V—V of FIG. 4; and

DETAILED DESCRIPTION OF THE PREFERRED EMBODIMENTS

Figure 1:
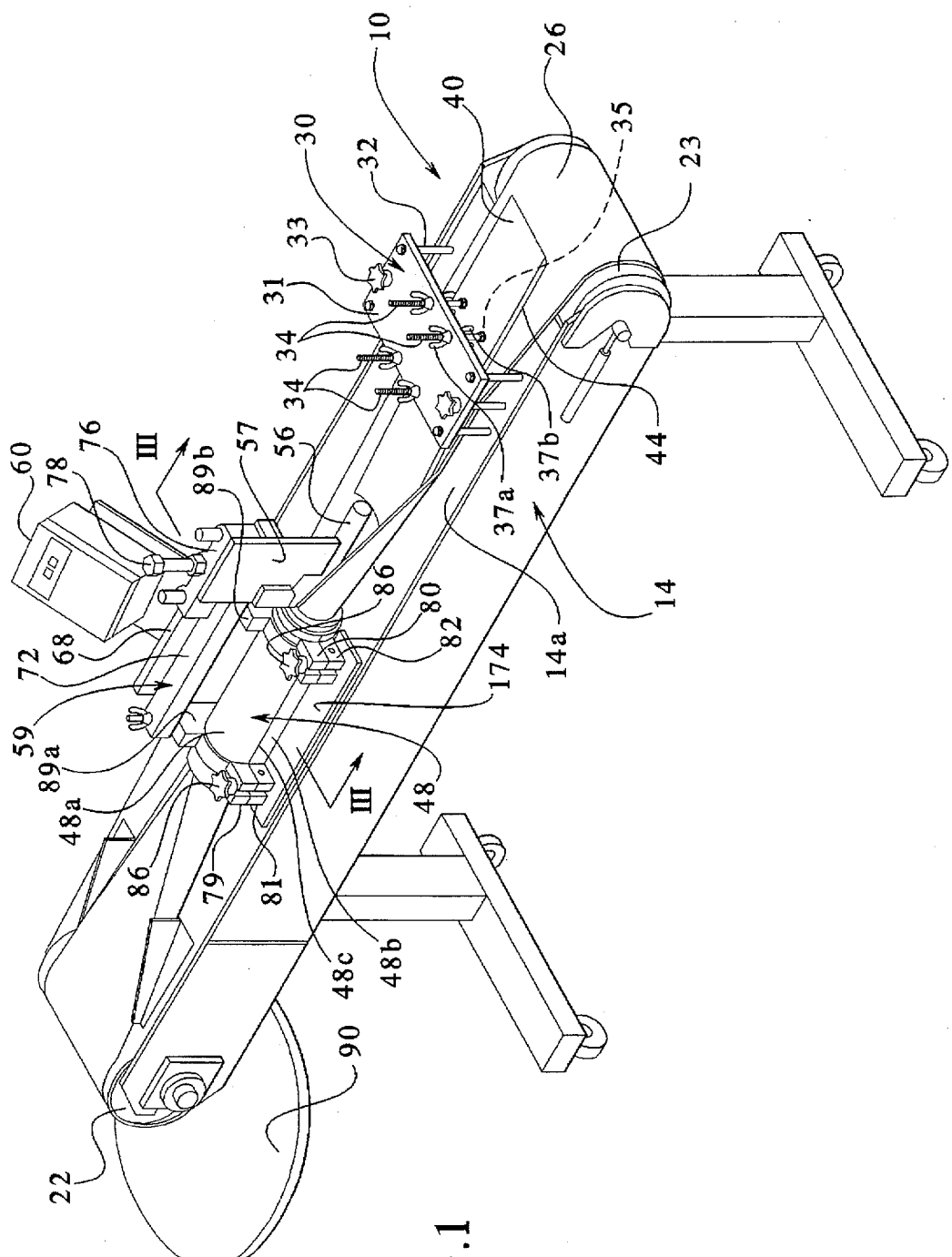
FIG. 1 is a perspective view of a dough forming machine of the present invention.

FIG. 1 illustrates a dough forming machine 10 having a frame 14 rotatably holding a drive drum 22 at one end thereof, and an idler drum 23 at an opposite end thereof. Wrapped around the drive drum 22 and the idler drum 23 is a continuous belt 26. At a first end adjacent the idler drum 23 is a dough guide bracket 30 which mounts a pressure plate 40 for receiving incremental amounts of dough or "dough pieces".

The bracket includes a flat plate 31 held elevated on vertical rods 32 extending from the frame 14 and secured thereto by star knob type nuts 33 or other means. Four threaded rods 34 extend downwardly from the plate 31 and are threaded into tapped holes 35 in the pressure plate 40. Lock nuts 36 on the rods 34 fix the rods 34 tightly to the plate 40. Opposing wing nuts 37a, 37b, on opposite sides of the plate 31, threaded onto the rods 34 are adjustably positioned to set the elevation and angle of the pressure plate 40 with respect to the belt 26. A dough piece placed on the belt 26 upstream of the pressure plate 40 is drawn by the belt 26 under the pressure plate 40. The plate 40 has an arcuate bottom surface 44. At a center region of the belt 26 is a forming tube 48. The belt 26 is wrapped into an approximate cylindrical shape by being threaded through the forming tube 48. The forming tube 48 comprises top and bottom semicircular sections 48a, 48b, split through a horizontal center plane 48c. Located axially within the forming tube 48 is a mandrel 56 which is a cylindrical elongate member. The mandrel 56 is supported by a mandrel support 57.

The forming tube 48 and the mandrel support 57 are supported from a stationary frame 59. A control panel 60 is also supported on the frame 59.

The sections 48a, 48b of the forming tube 48 are supported by an assembly mount plate 68. Connected to the mount plate 68 is a mandrel mount bar 72 which is adjustably connected to a mandrel adjusting block 76. The adjusting block 76 holds a vertical adjusting screw 78 for raising and lowering the adjusting block 76 with respect to the mount bar 72. The adjusting block 76 is connected to, or integral with, the mandrel support 57 so that the mandrel 56 can be positionally adjusted with respect to the forming tube 48. The forming tube top section 48a includes two horizontal U-shaped lugs 79, 80 which are aligned across the seam 48c with corresponding U-shaped lugs 81, 82 of the bottom section 48b. The lug pairs 79, 81 and 80, 82 are clamped together by nuts such as star knobs 86 which are threaded onto pivotal connecting studs 88, pivoted on pins 88a as shown in FIG. 3 and 4. The top section 48a is connected to the mount bar 72 at two lugs 89a, 89b.

Figure 2:
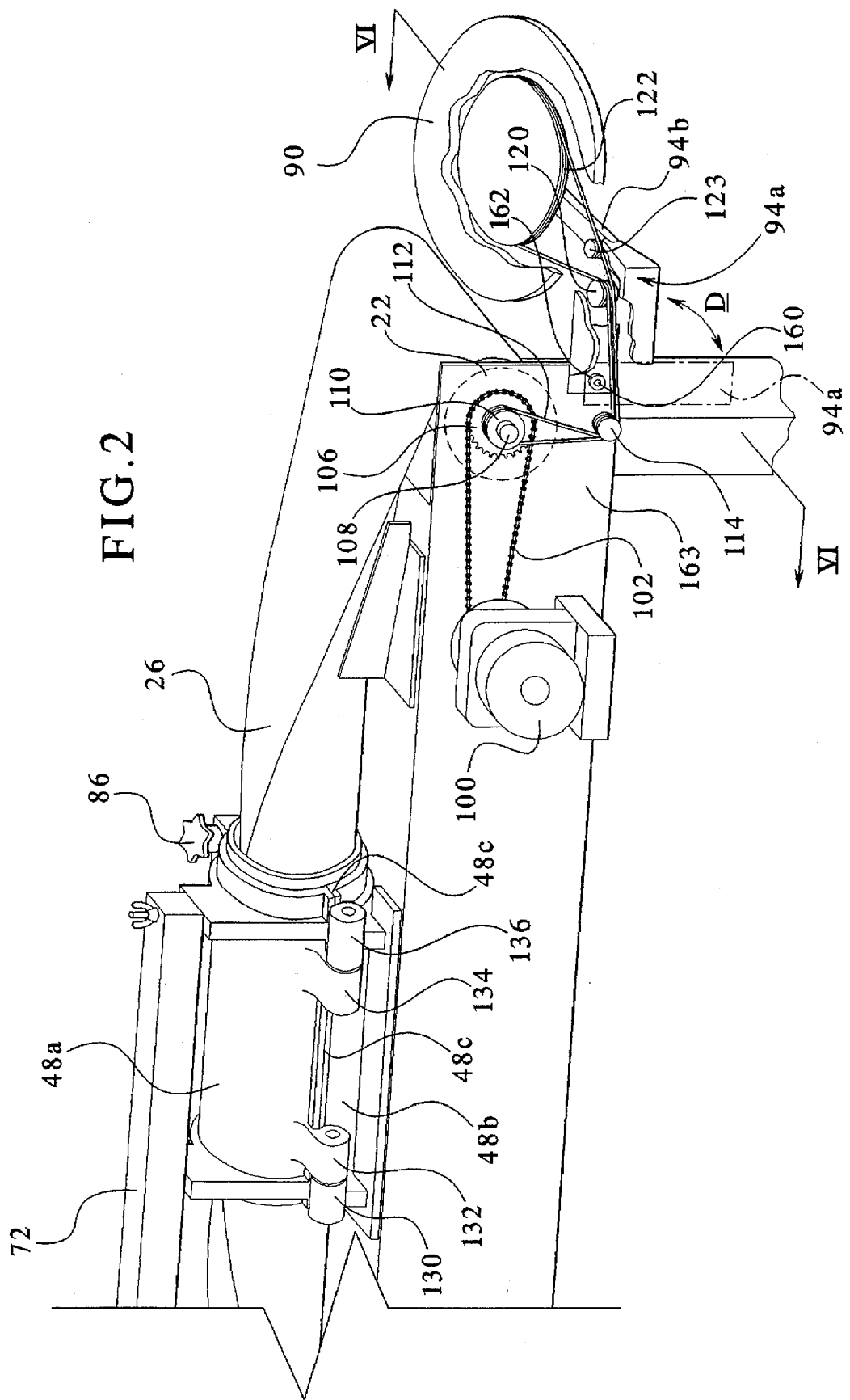
FIG. 2 is a back side partial perspective view of the machine shown in FIG. 1.

At a discharge end of the belt 26, mounted below the belt, is a rotary table or carousel 90 for receiving formed annular dough shapes from the belt 26 for further processing, packing, or baking. The carousel 90 is mounted via an L-shaped cantilever swing arm 94 proceeding from the frame as shown in FIG. 2. The swing arm 94 has a down turned U-shaped channel base section 94a attached to the frame 14 as described below. Extending from the base section 94a is a support arm section 94b welded to the base section 94a and providing a bearing arrangement to allow rotation of the carousel 90 on the support arm section 94b (shown in FIG. 6). Alternately, a different receiving station than the carousel 90 could be utilized such as an additional conveyor belt or box or other such means for receiving the formed dough.

FIG. 2 illustrates the drive arrangement for both the drive roller 22 and the carousel 90. A motor 100 drives a chain 102 via a motor sprocket (not shown). The chain 102 is wrapped around a drive roller sprocket 106 which is fixed to a shaft 108 which drives the drive roller 22. Also fixed to the shaft 108 is a single pulley 110 which receives a drive belt 112 for driving the carousel 90. The belt is received on parallel grooves of dual pulley 114 which is rotatably mounted on a shaft 116. The belt passes beneath the swing arm 94 and is there wrapped around parallel grooves of a double pulley 120, and thereafter one segment of the belt is wrapped around a circular bearing surface 122 of the carousel 90 and the other is guided by a singular pulley 123 before wrapping the bearing surface 122. Thus, circulation of the sprocket 106 drives the pulley 110 which circulates the belt 112 over the dual pulley 114 and the double pulley 120 which circulates the belt around the bearing surface 122 for rotating the carousel on the support arm section 94b at the desired speed. The bearing surface 122 is intentionally sized to be relatively large to reduce the rotary speed of the carousel to a workable level.

The swing arm 94 is attached by a bolt 160 which can be tightened by a nut 162 to lock the arm 94 in the horizontal orientation to a side plate 163 of the frame 14. When the Unit is desired to be shipped or for storage, this nut 162 can be loosened and the entire swing arm 94 and carousel 90 can be pivoted downwardly in the direction D (clockwise in FIG. 2) to underlie the bottom surface of the belt 26 for increased compactness of the machine during nonuse of the carousel. The dashed line showing of base section 94a indicates the orientation of the entire arm 94 and carousel 90 assembly.

Figure 6:
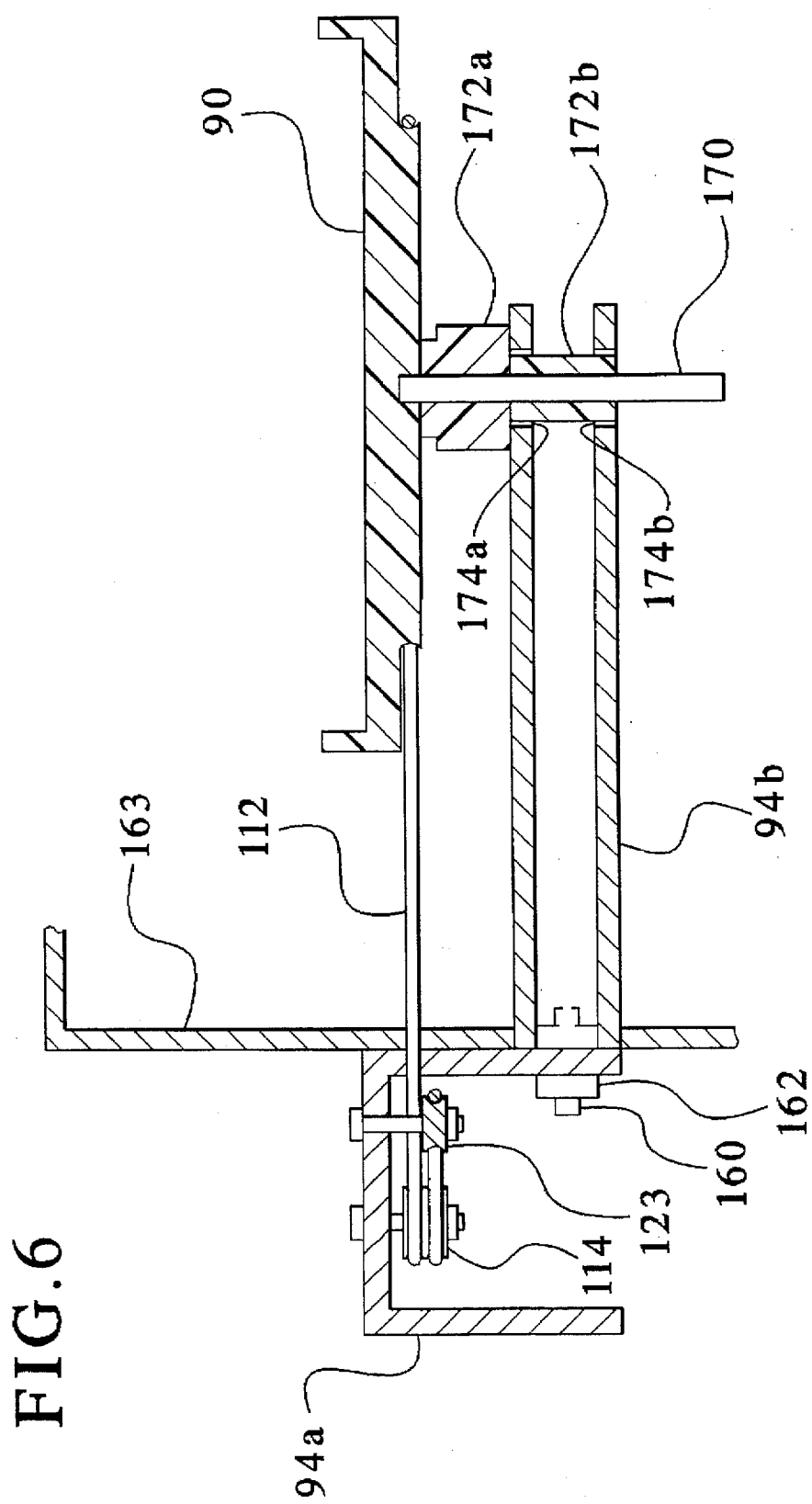
FIG. 6 is a sectional view taken generally along line VI—VI of FIG. 2.

FIG. 6 shows the carousel 90 mounted to the support arm section 94b which is a box channel structural member. A steel axle 170 fits within a plastic bearing 172 having a support cylinder section 172a and a journal cylinder section 172b held within holes 174a, 174b of the support arm section. The axle 170 and bearing 172 allows rotation of the carousel 90 on the support arm section 94b.

FIG. 2 also shows the forming tube 48 having the top section 48a and the bottom section 48b and the horizontal seam 48c, and includes coacting hinge parts 130, 132 and 134, 136 for allowing the top part 48a to pivot upwardly away from the bottom part 48b. Star shape knobs 86, when loosened allow the threaded studs 88 to pivot downwardly as shown in FIG. 4, away from connecting lugs 79, 80 such that the top section 48a can pivot upwardly.

As shown in FIG. 3 and 5, a cylindrical plastic insert 150 composed of half cylinders 150a, 150b can be fit within the forming tube 48 to decrease the inside diameter of the forming tube 48 to guide the belt 26 into a smaller diameter to form smaller circular dough pieces, e.g., smaller bagels. The inserts 150 permit a single outer tube size to be used with multiple sized inserts to achieve different sizes of bagels economically. The inserts have a seam 154 which can be arranged to form a vertical joint, horizontal joint, or other orientation. Each insert 150a, 150b, is identically formed and includes a radially extending semi-annular flange 150c, 150d respectively on an upstream end of the insert according to the moving direction of the belt 26. These flanges prevent downstream slippage of the insert in the tube 48.

Because the inserts 150 add to the overall strength and rigidity of the forming tube 48, a less substantial forming tube can be used, i.e. a thicker forged tube can be avoided, and a thinner wall tube can be used.

As shown in FIG. 4, the top section 48a of the tube 48 has been pivoted upwardly and backwardly about the hinge parts 130, 132, 134, 136. The two star knobs 86 have been loosened and the rods 88 pivoted downwardly about pins 38a connected thereto and journalled in U-shaped lugs 81, 82. The forming tube section is supported on a flat surface 14a of the frame 14 by a front plate 174 and a rear plate 176.

Tube seam 48c is arranged to be 90° to the belt edge converging area within the tube, allowing for easier closing of the tube onto the wrapped belt within the tube. Arranging the insert seam 154 at 90° to the belt edge converging area also allows for easier closing of the tube around the wrapped belt.

Although the present invention has been described with reference to a specific embodiment, those of skill in the art will recognize that changes may be made thereto without departing from the scope and spirit of the invention as set forth in the appended claims.

We claim as our invention:

1. A dough forming machine comprising:

a stationary frame;

a continuous circulating belt having a top horizontal segment;

a forming tube positioned on said frame surrounding a portion of said top horizontal segment, said forming tube having open ends causing lateral edges of said belt to curl upwardly forming a substantially circular cross section of said belt as said belt translates longitudinally through said tube;

a mandrel mounted to extend axially through said tube;
said tube having a horizontal seam for separating said tube into two semi-cylindrical parts, said two semi-cylindrical parts removably fastened together.

2. The dough forming machine according to claim 1, further comprising a cylindrical insert, mounted within said tube and surrounding said portion of said top horizontal segment, for reducing an inside diameter of said forming tube.

3. The dough forming machine according to claim 1, wherein said tube semi-cylindrical parts are hinged together at a back side thereof and further comprising fastening lug pairs arranged fixed on said semicylindrical parts on opposite sides of said seam and fastened together with a threaded rod and nut.

4. The dough forming machine according to claim 1, further comprising a pressure plate mounted to said frame above said belt, and having an arcuate cross section facing said belt, and spaced from said belt, located upstream of said forming tube in a dough movement direction, said pressure plate composed of plastic.

5. The dough forming machine according to claim 4, further comprising a motor for circulating said belt, and a rotating table located downstream of said belt for receiving formed dough pieces from said belt, and a drive belt, said drive belt wrapped around a portion of said rotating table to impart rotation thereto, and operatively connected to said motor for being driven by said motor.

6. The dough forming machine according to claim 5, further comprising a drive drum wrapped by said belt for circulating said belt, a drum sprocket connected to said drive drum, a chain, a drive sprocket connected to an output shaft of said motor, said chain wrapped around said drive sprocket and said drum sprocket for driving said drive drum upon rotation of said motor shaft, and a pulley connected to said drive drum to rotate therewith, said drive belt wrapped around said pulley.

7. The dough forming machine according to claim 5, wherein said rotating table is pivotably connected to said frame about a horizontal axis, said pivotable connection loosenable to pivot said rotating table downward to a non-use position.

8. The dough forming machine according to claim 1, wherein said stationary frame comprises a top surface arranged beneath said top horizontal segment of said belt, said top surface formed in a single plane.

9. The dough forming machine according to claim 1 further comprising a rotatable table and means for rotating said table, said table located below a downstream end of said continuous belt for receiving formed dough pieces from said continuous belt, said table supported from said frame by a cantilever support arm, said support arm connected by a pivotable connection to said frame to selectively pivot downwardly into a non-use position.

10. The dough forming machine according to claim 1 wherein said two semi-cylindrical parts comprise on a front side at least one pair of U-shaped lugs located on said parts across said horizontal seam and comprising a threaded rod connected to one of said U-shaped lugs and extending through said U-shaped lugs and having a nut threaded thereon to clamp a respective other of said U-shaped lugs to said one of said U-shaped lugs; and comprising on a back side of said semicylindrical parts, cooperating hinge parts connected across said horizontal seam between said two semi-cylindrical parts.

11. A bagel forming device comprising:
a horizontal frame having a longitudinal length;
a drive roller, powered by a motor, positioned at one longitudinal end of said frame;
an idler roller positioned at an opposite longitudinal end of said frame;
a belt having a defined width between lateral outer edges and a continuous length extending between and around said drive roller and said idler roller to form an upper carrying surface and a lower return surface, said belt being driven by said drive roller and returned by said idler roller to move in a continuous fashion in a downstream direction;
a forming tube positioned along a portion of said upper carrying surface of said belt, through which said belt is directed, such that said belt is caused to curve up at said outer edges to form a cylinder shape within said forming tube;
said forming tube being a split cylinder, with said split being formed horizontally, thereby defining an upper half and a lower half of said tube, said upper half and lower half being pivotally joined along their length at one side and having a locking device along an opposite side to selectively hold said forming tube in a closed cylindrical position;
a forming cylinder comprising a longitudinally split cylinder sized to removably fit within said forming tube to define an interior diameter of a size to provide a formed bagel of a desired diameter;
a mandrel extending into said forming cylinder and having an external diameter of a size to provide a desired hole size in said formed bagel;
a pressing plate positioned over said belt, upstream of said forming tube, to engage dough pieces placed on said belt and to cause them to roll between said moving belt and said pressing plate to form laterally extending dough pieces to be carried by said belt into said forming tube, said pressing plate being formed of a single solid piece of plastic material, and being rigidly, but adjustably positioned above said belt;
a rotatable take-off carousel table positioned below said belt at a downstream end thereof to receive formed bagels from said belt as said belt carrying said formed bagels moves around one of said rollers;
said take-off table being rotatably powered by a belt drive drivingly connected to said motor;
said take off table being connected to said frame by means of a pivot with said pivot having a horizontal axis such that said table can be pivoted downwardly when not in use to a storage position under said frame.

12. The bagel forming device of claim 11, wherein a plurality of said forming cylinders are provided, each with different internal diameters, such that bagel sizes can be changed easily and quickly by unlocking said locking devices, pivoting open said forming tube, and removing and replacing said forming cylinder with another cylinder of a different internal diameter.

13. A dough forming machine comprising:
a stationary frame;
a continuous circulating belt having a top horizontal segment;
a forming tube positioned on said frame surrounding a portion of said top horizontal segment, said forming tube having open ends causing lateral edges of said belt to curl upwardly forming a substantially circular cross section of said belt as said belt translates longitudinally through said tube;

a mandrel mounted to extend axially through said tube;

a cylindrical insert having an outside diameter equal to an inside diameter of said forming tube, said insert being removably installed into said forming tube to reduce said circular cross section of said belt through said forming tube.

14. The dough forming machine according to claim 13 wherein said insert is composed of plastic.

15. The dough forming machine according to claim 13 wherein said forming tube and said insert each comprise a longitudinal seam.

16. The dough forming machine according to claim 13 wherein said insert comprises an annular flange at one end thereof, said flange having an outside diameter greater than said inside diameter of said forming tube.

* * * * *